Feb. 6, 1968     R. BERNERON     3,367,229
SPECTRUM ANALYSIS OF METALLIC SAMPLES IN OPEN AIR
Filed May 21, 1963                2 Sheets-Sheet 1

INVENTOR
ROGER BERNERON
by
Michael S. Striker
atty

United States Patent Office 3,367,229
Patented Feb. 6, 1968

3,367,229
SPECTRUM ANALYSIS OF METALLIC SAMPLES IN OPEN AIR
Roger Berneron, Saint Germain-en-Laye, France, assignor to Institut de Recherches de la Siderurgie Francaise, Saint Germain-en-Laye, France, a professional institution of France
Filed May 21, 1963, Ser. No. 282,101
Claims priority, application France, June 4, 1962, 899,541
7 Claims. (Cl. 88—14)

ABSTRACT OF THE DISCLOSURE

Spectrum analysis is carried out in the open air and undesirable light emission effects are avoided by causing a stream of a non-oxidizing gas to sweep the substantially plane undersurface of the sample which is burned in an electric arc by means of a counter electrode. The nozzle for blowing the gas across the surface of the sample is a narrow width, substantially semi-circular outlet surrounding the space immediately beneath the undersurface of the sample.

The present invention relates to improvements in processes and means for the spectrum analysis of metallic samples in open air.

It is known that spectrum analysis of metallic samples in open air under conditions of burning in an electric arc or spark, and in particular in the ultraviolet region, is limited in its sensitivity by the emission of a continuous spectral background and certain molecular bands such as those of cyanogen, and by the oxidation of the surface of the sample which has the effect of reducing the luminosity of the spectrum. It is also well known that the presence of foreign elements in the sample analyzed, as well as the metallical history of said sample (forging, hardening, rolling) have an influence on the relative intensities of the spectrum lines of the elements analyzed. It is also known that it is necessary to stabilize the discharge voltage, thereby making it necessary to make use of costly regulating means.

The main object of the present invention is to increase the sensitivity of spectrum analysis of metallic samples in the open air by either eliminating or reducing the emission of the continuous spectral background and molecular bands in the useful portion of the spectrum, and by increasing the luminous intensity of the spectrum lines which are characteristic of the elements being analyzed.

Another object of the invention is to increase the reproducibility and accuracy of measurements by eliminating the influences of the metallurgical history of the sample or of foreign elements on the relative intensities of the spectrum lines of the elements analyzed.

A further object of the invention is to make it possible to operate simply and quickly in free air and also to permit the elimination of the discharge voltage regulating device, at least under conditions of analysis by means of a high-frequency electric spark.

With the above and other objects in view, the present invention contemplates improvements in processes for the emission of light in a free atmosphere for the spectrum analysis of a metallic sample under conditions of burning in an electric arc or spark by means of a counter-electrode, which consists in establishing on the surface of said sample, in the space which separates said sample from the counter-electrode, a continuous film of at least one non-oxidizing gas flowing tangentially to said surface.

The gas which is most commonly employed is chosen among one of the following elements, either alone or in a mixture: rare gas (helium or argon), nitrogen, hydrogen.

According to the invention, a device for carrying out the above-mentioned process comprises in combination a stand designed to support a metallic sample and a counter-electrode, a source of at least one non-oxidizing gas, a fluid-tight conduit, at least one flattened nozzle connected to said source by said fluid-tight conduit, said nozzle terminating in at least one thin opening and being arranged and adapted in said stand in such manner that the gas stream which is discharged therefrom into free air sweeps the surface of said sample.

Means may be provided for maintaining the overpressure of the gas relative to the atmosphere at a constant value at the nozzle inlet. Means for reducing the variations of said overpressure, may be adapted to co-operate with said nozzle and said conduit.

Still according to the invention, a device for carrying out the above mentioned process comprises in combination a stand designed to support a metallic sample and a counter-electrode, a source of at least one non-oxidizing gas, a fluid-tight conduit, at least one flattened nozzle connected to said source by said fluid-tight conduit, said nozzle having at its free end two thin horizontal lips set close together and having the shape of a segment of a plane circular ring, the concave portion of which embracing the inter-electrode space, a vertical semi-circular passage in the nozzle connected to said lips, a lower passage connected to said vertical passage, a flattened divergent conduit having a large and a small opening, said conduit being connected to said lower passage by its large opening and to the fluid-tight conduit by its small opening, and a pressure governor inserted in said fluid-tight conduit.

Researches conducted by the present applicant gave rise to the belief that it would be possible to eliminate certain disadvantages which are involved in the use in spectrum analysis of electric arcs or electric sparks in open air, without thereby relinquishing the simplicity of application which is inherent in such light sources, by causing to circulate in free air a flow of non-oxidizing gas along the surface on which the discharge impinges on the sample.

The least that could be expected was a reduction in oxidation processes and therefore an increase in and stabilization of the luminous intensity of the spectrum which is emitted, as well as a substantial reduction of certain undesirable molecular bands (cyanogen). Moreover, the preferred use of gas having a low ionization potential and molecular dissociation potential could also make it reasonable to expect in addition a favorable action on the continuous spectral background, particularly in the ultra-violet region. It was above all of practical interest to endeavor to devise a simple method of eliminating the influence of foreign elements and of the metallurgical history of the sample (rolling, forging, hardening) on the relative intensities of the spectrum lines which are characteristic of the elements analyzed. It was hitherto possible to achieve this object only at the cost of long and complicated handling operations which call for the application of costly means and the adoption of light-sources in a confined atmosphere.

Experience has confirmed expectations regarding the increase in luminous intensity, in the elimination of undesirable molecular bands and in the reduction of the continuous spectral background; and it has become strikingly apparent that these improvements could be quantitatively very substantial. For example, it accordingly follows that the luminosity of the spectrum lines could be increased in a proportion of 1 to 10 and the intensity of the continuous spectral background could be reduced in a proportion of 10 to 1.

A systematic study of optimum conditions has served to point out another surprising result: it is merely necessary to form a film of non-oxidizing gas which is continuously renewed at the surface of the metallic sample, without any need for concern as to whether the said gas sweeps or does not sweep the tip of the counter-electrode, in order to achieve these improvements and in order to ensure that the relative intensities of the spectrum lines are not influenced by the presence of foreign elements and by the metallurgical history of the sample.

As will accordingly be understood, the present invention makes it possible to obtain in a simple and inexpensive manner both increased sensitivity and excellent reproductibility of measurements, even in the case of conditions which are generally considered as unstable such as the electric arc and conditions of spark formation with self-induction, inasmuch as the potentials of molecular dissociation and ionization of the gas employed regularize respectively both electric arcs and electric sparks. The spectral characteristics of the discharge become independent of voltage variations and accordingly depend only on the pressure of the gas employed, the constancy of which can readily be ensured.

The invention will be more readily understood from the following description of a device for the practical application thereof, as given by way of example and not in any sense by way of limitation with reference to the accompanying drawings, in which.

Figure 1:
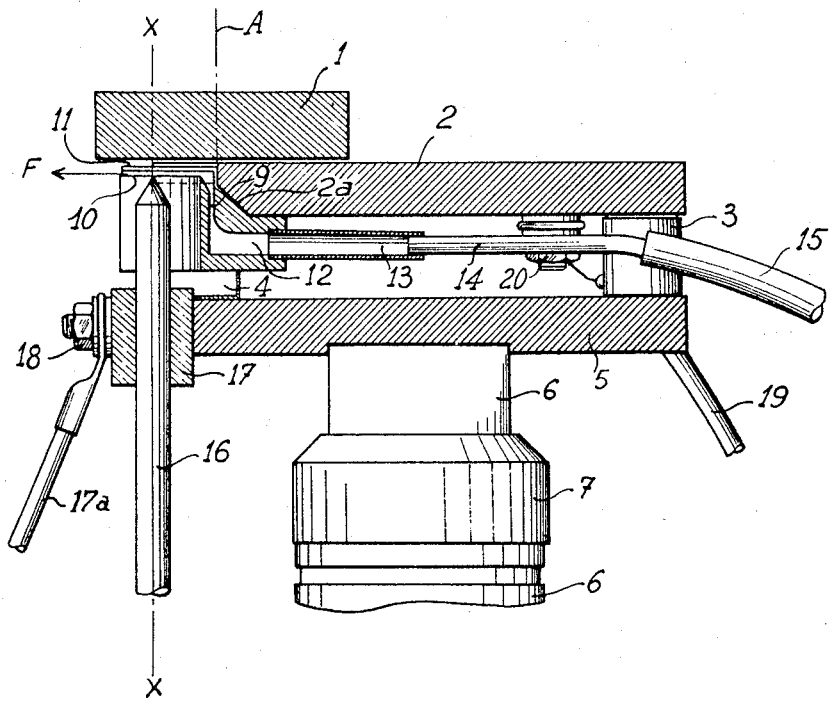
FIG. 1 is a vertical sectional view of a stand of known design on which is fitted in accordance with the invention a nozzle intended to produce a film of gas on the surface of the sample.

In FIG. 1, a sample 1 to be analyzed is placed on a metallic plate 2 which is supported by insulating spacers 3 and 4 on a plate 5 and a vertical telescopic column 6, the height of which can be adjusted by means of a knurled ring 7 in accordance with a known arrangement.

A chamfer 2a is formed in the edge of the plate 2 and a horizontal semi-circular recess which is centered on a vertical axis $xx$ is cut in the chamfered edge of the plate 2. There has been drawn in the figure a vertical line A which makes it possible to locate the bottom of said recess, the radius of which is equal to the distance between the vertical axis $xx$ and said line A.

Figure 2:
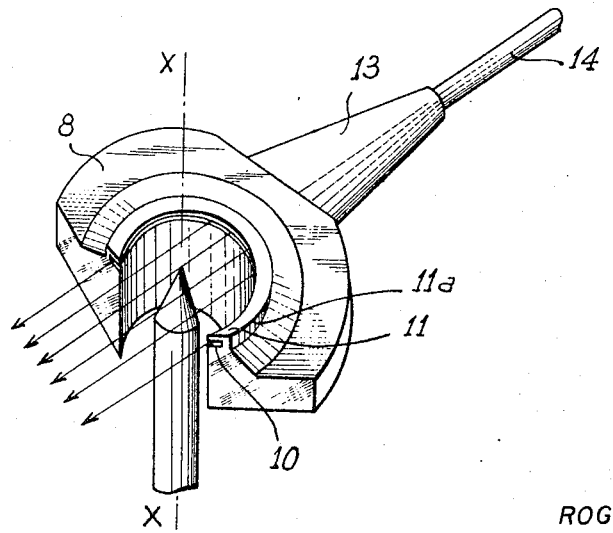
FIG. 2 is a perspective view of the nozzle and of the counter-electrode.

A nozzle 8 which is also illustrated in FIG. 2 comprises a vertical passage 9, the transverse cross-section of which is an arc of a circular ring about the axis $xx$. The said vertical passage terminates at the top in two horizontal lips 10 and 11 which are thin and formed close together, and between which is discharged a film F of a gas-flow. The lower passage 12 of the nozzle 8 is connected to a flattened divergent tube 13 which is secured to a tube 14 and a flexible conduit 15 which supplies the gas to the nozzle.

The wall of the upper lip 11 of the nozzle forms a circular shoulder 11a and fits into the recess of the plate 2 in such manner as to ensure that the upper lip 11 is flush with the surface of the sample. A cylindrical counter-electrode 16 is secured to the lower plate 5 by means of a bronze ring 17 which is connected to one terminal of an electric generator of known design (which has not been illustrated in the drawings) by means of a cable 17a which is secured to the ring 17 by means of a nut 18. The other terminal of the generator is connected by means of a cable 19 to the plate 2 on which said cable 19 is fastened by means of a nut 20.

Figure 3:
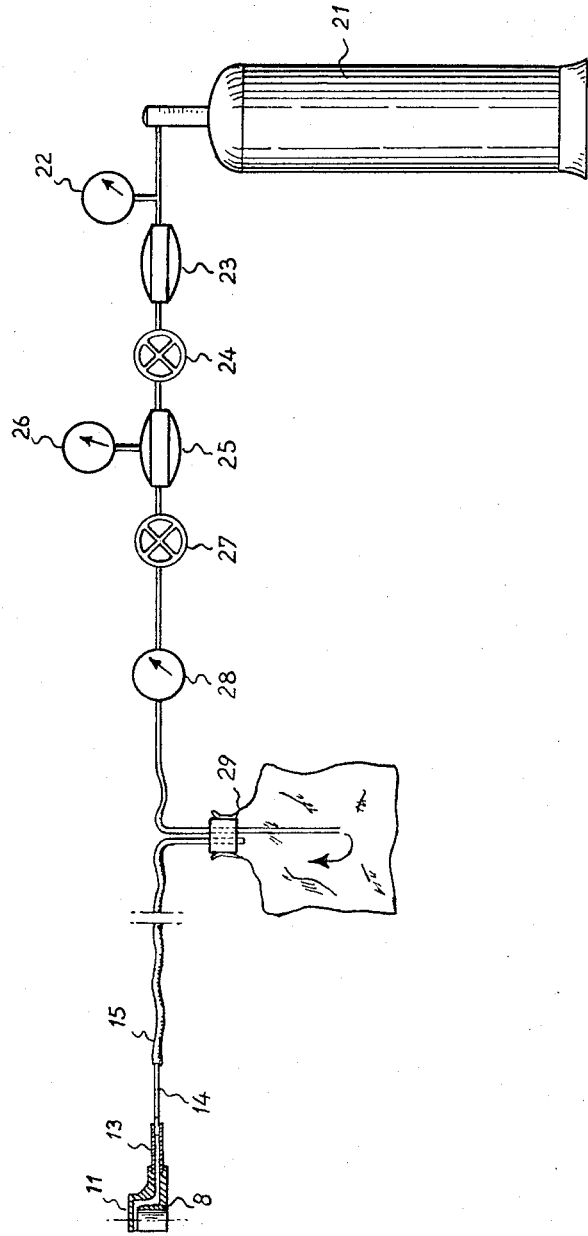
FIG. 3 is a diagram of the circulation system for the supply of gas to the nozzle which is illustrated in FIG. 2.

FIG. 3 illustrates diagrammatically the nozzle 8 and a device for the delivery of a stream of argon at a constant rate.

The argon is supplied from a cylinder 21 in which said gas is stored at a high pressure. A pressure gauge 22 provides a means of ascertaining the pressure which prevails in said cylinder and of assessing the quantity of gas in reserve. The gas pressure is reduced in a first expansion chamber 23. The gas flows through a needle valve 24 and penetrates inside a second chamber 25 in which the gas pressure reaches a constant pre-determined pressure above atmospheric pressure; said pressure is indicated by a pressure-gauge 26 and can be regulated in respect of a given flow rate by adjusting the openings of the needle valve 24 and of another needle valve 27 providing a passageway for the gas stream which passes out of the chamber 25. The gas flow rate is indicated by a flow meter 28. Finally a bladder 29 which is placed between said flow meter and the nozzle 8 makes it possible either to eliminate or to reduce the influence of variations in atmospheric pressure on the rate of flow of gas which is discharged from the nozzle 8.

It will readily be understood that a device of this type co-operates with an analytical spectrometer of known design.

By feeding to the nozzle a flow of argon under an over-pressure of 10 millimeters of water relative to atmospheric pressure, it has been possible under conditions of high-frequency spark formation to determine percentages in samples of zinc as follows: Cu, 0.0002%; Sn, 0.001%; Fe, 0.002%; and in a sample of brass containing 70% copper and 30% zinc, it has been possible to determine proportions of Mn, Sn, Fe, Pb, As, as low as 0.001%. In addition, calibration diagrams of various cast irons have been drawn up for the purpose of effecting the determination of different elements and it has been found that these diagrams coincided with the calibration lines of low alloy steels over the full extent of the spectral region in which the operation has been carried out, namely between 2000 A. and 4000 A., which confirms that the influence of metallurgical history and of foreign elements no longer plays any part.

The foregoing example is not intended to be limitative in any respect and has been given solely for the purpose of explanatory illustration in order that a clear understanding may be had of the invention, and is not intended to limit the scope thereof. It accordingly follows that a large number of improvements and detail variants could be devised without thereby departing either from the scope or the spirit of the invention.

What is claimed is:

1. A device for the control of light emission during spectrum analysis which device comprises support means for a sample, said sample having a substantially flat surface, a counter-electrode held by said support means and having a tip directed against said surface, duct means connected to a source of at least one non-oxidizing gas, and a nozzle held by said support means, said nozzle being connected to said duct means and terminating at its free end in a narrow opening disposed to direct a gas stream emanating therefrom so as to sweep the surface of said sample.

2. The device of claim 1 wherein the nozzle is of a flattened shape and terminates in a thin slot in proximity to the said surface of said sample.

3. The device of claim 1, wherein the nozzle terminates in at least one row of narrow openings disposed in proximity to the surface of said sample.

4. The device of claim 1, wherein means are provided to maintain the gas fed through said nozzle at a constant value of pressure above atmospheric.

5. The device of claim 4, wherein the said pressure means include an inflatable sack disposed in the course of the fluid-tight conduit at a place between the source of non-oxidizing gas and the nozzle.

6. A device for the control of light during spectrum analysis, which device comprises support means for a sample, said sample having a substantially flat surface, a counter-electrode held by said support means and having a tip directed against said surface, duct means connected to a source of at least one non-oxidizing gas, and a nozzle supported by said support means, the said nozzle being connected to said duct means and having at its free end a narrow, elongated opening of substantially semi-circular shape, the said opening surrounding the space between the surface of the sample and the tip of the counter-electrode.

7. The device of claim 6, wherein an L-shaped passage is formed in said nozzle, the vertical part of said L-passage being semi-circular in plan view and leading to said opening and the horizontal part of the L-passage connecting with said duct means, and the duct means having a flaring end attached to the horizontal part of said L-shaped passage of said nozzle.

References Cited

UNITED STATES PATENTS

| | | | |
|---|---|---|---|
| 1,971,215 | 8/1934 | Feussner | 88—14 |
| 2,771,149 | 11/1956 | Miller et al. | 88—14 |

OTHER REFERENCES

Churchill, Industrial and Engineering Chemistry, vol. 16, No. 11, November 1944, pp. 655–656.

Stallwood, "Air Cooled Electrodes for the Spectrochemical Analysis of Powders," Journal of the Optical Soc. of America, vol. 44, No. 2, February 1954, pp. 171–172.

Thiers, "The Advantages of Controlled Atmospheres for Arc Spectroscopy," Applied Spectroscopy, vol. 7, No. 4, November 1953, pp. 157–158.

JEWELL H. PEDERSEN, *Primary Examiner.*

RONALD L. WIBERT, *Examiner.*